US007996461B1

(12) United States Patent
Kobres et al.

(10) Patent No.: US 7,996,461 B1
(45) Date of Patent: Aug. 9, 2011

(54) METHOD OF REMOTELY CONTROLLING A USER INTERFACE

(75) Inventors: Erick C. Kobres, Lawrenceville, GA (US); David E. Moore, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 728 days.

(21) Appl. No.: 10/354,555

(22) Filed: Jan. 30, 2003

(51) Int. Cl.
G06F 15/16 (2006.01)
G06F 3/00 (2006.01)
A63F 9/02 (2006.01)
(52) U.S. Cl. ......... 709/204; 709/205; 715/753; 186/59
(58) Field of Classification Search .......... 709/217–219, 709/223–229, 208–211, 204–207; 186/35–69; 705/16–21; 714/744–759; 715/753–759
See application file for complete search history.

(56) References Cited

U.S. PATENT DOCUMENTS

| | | | | |
|---|---|---|---|---|
| 5,083,638 A * | 1/1992 | Schneider | ........... | 186/61 |
| 5,115,888 A * | 5/1992 | Schneider | ........... | 186/61 |
| 5,123,494 A * | 6/1992 | Schneider | ........... | 177/50 |
| 5,125,465 A * | 6/1992 | Schneider | ........... | 177/50 |
| 5,168,961 A * | 12/1992 | Schneider | ........... | 186/52 |
| 5,241,625 A * | 8/1993 | Epard et al. | ........... | 345/502 |
| 5,724,530 A * | 3/1998 | Stein et al. | ........... | 715/748 |
| 5,889,946 A * | 3/1999 | FitzPatrick et al. | ........... | 709/205 |
| 5,898,158 A * | 4/1999 | Shimizu et al. | ........... | 235/383 |
| 5,907,275 A * | 5/1999 | Battistini et al. | ........... | 340/286.09 |
| 6,023,714 A * | 2/2000 | Hill et al. | ........... | 715/235 |
| 6,081,265 A * | 6/2000 | Nakayama et al. | ........... | 715/746 |
| 6,151,622 A * | 11/2000 | Fraenkel et al. | ........... | 709/205 |
| 6,195,694 B1 * | 2/2001 | Chen et al. | ........... | 709/220 |
| 6,240,444 B1 * | 5/2001 | Fin et al. | ........... | 709/205 |
| 6,285,363 B1 * | 9/2001 | Mairs et al. | ........... | 715/751 |
| 6,295,551 B1 * | 9/2001 | Roberts et al. | ........... | 709/205 |
| 6,356,934 B1 * | 3/2002 | Delph | ........... | 709/204 |
| 6,446,110 B1 * | 9/2002 | Lection et al. | ........... | 709/203 |
| 6,466,250 B1 * | 10/2002 | Hein et al. | ........... | 348/14.16 |
| 6,507,352 B1 * | 1/2003 | Cohen et al. | ........... | 715/817 |
| 6,754,693 B1 * | 6/2004 | Roberts et al. | ........... | 709/205 |
| 6,754,704 B1 * | 6/2004 | Prorock | ........... | 709/224 |
| 6,757,869 B1 * | 6/2004 | Li et al. | ........... | 715/205 |
| 6,760,045 B1 * | 7/2004 | Quinn et al. | ........... | 715/744 |
| 6,760,749 B1 * | 7/2004 | Dunlap et al. | ........... | 709/204 |
| 6,772,144 B2 * | 8/2004 | Brid et al. | ........... | 1/1 |
| 6,928,464 B2 * | 8/2005 | Appiah et al. | ........... | 709/204 |
| 6,940,393 B2 * | 9/2005 | Dev et al. | ........... | 340/286.09 |
| 6,993,711 B1 * | 1/2006 | Tanaka et al. | ........... | 715/248 |
| 7,293,243 B1 * | 11/2007 | Ben-Shachar et al. | ........... | 715/781 |

(Continued)

*Primary Examiner* — Brendan Higa
(74) *Attorney, Agent, or Firm* — Paul W. Martin; Harden E. Stevens, III

(57) ABSTRACT

A method of remotely controlling a user interface which includes peer-peer client/server software modules that allow the user interface on a host computer to be displayed by a remote terminal. The method includes the steps of sending a request to a host application of a first computer to establish a remote control session by a second computer over a network connection between the first and second computers, establishing a communication session between a user interface server of the first computer and a user interface client of the second computer, sending a current presentation of the host application rendered by a user interface engine to the user interface client by the user interface server, wherein the presentation includes visual display information displayed on a display of the first computer, rendering the presentation by a user interface engine of the second computer, sending user interface events from the user interface client to the user interface server, and calling the user interface engine of the first computer by the user interface server to report the user interface events.

6 Claims, 2 Drawing Sheets

U.S. PATENT DOCUMENTS

| | | | |
|---|---|---|---|
| 7,458,029 B2 * | 11/2008 | Agrawala et al. | 715/744 |
| 2002/0038346 A1 * | 3/2002 | Morrison et al. | 709/205 |
| 2002/0059377 A1 * | 5/2002 | Bandhole et al. | 709/204 |
| 2002/0170782 A1 * | 11/2002 | Millikan | 186/61 |
| 2002/0194074 A1 * | 12/2002 | Jacobs | 705/16 |
| 2003/0078849 A1 * | 4/2003 | Snyder | 705/23 |
| 2003/0229846 A1 * | 12/2003 | Sethi et al. | 715/500 |
| 2003/0229851 A1 * | 12/2003 | Willumeit et al. | 715/513 |
| 2004/0017394 A1 * | 1/2004 | Adachi | 345/744 |
| 2004/0046787 A1 * | 3/2004 | Henry et al. | 345/744 |
| 2004/0049427 A1 * | 3/2004 | Tami et al. | 705/24 |
| 2004/0080504 A1 * | 4/2004 | Salesky et al. | 345/418 |
| 2004/0083291 A1 * | 4/2004 | Pessi et al. | 709/227 |
| 2007/0294626 A1 * | 12/2007 | Fletcher et al. | 715/751 |

* cited by examiner

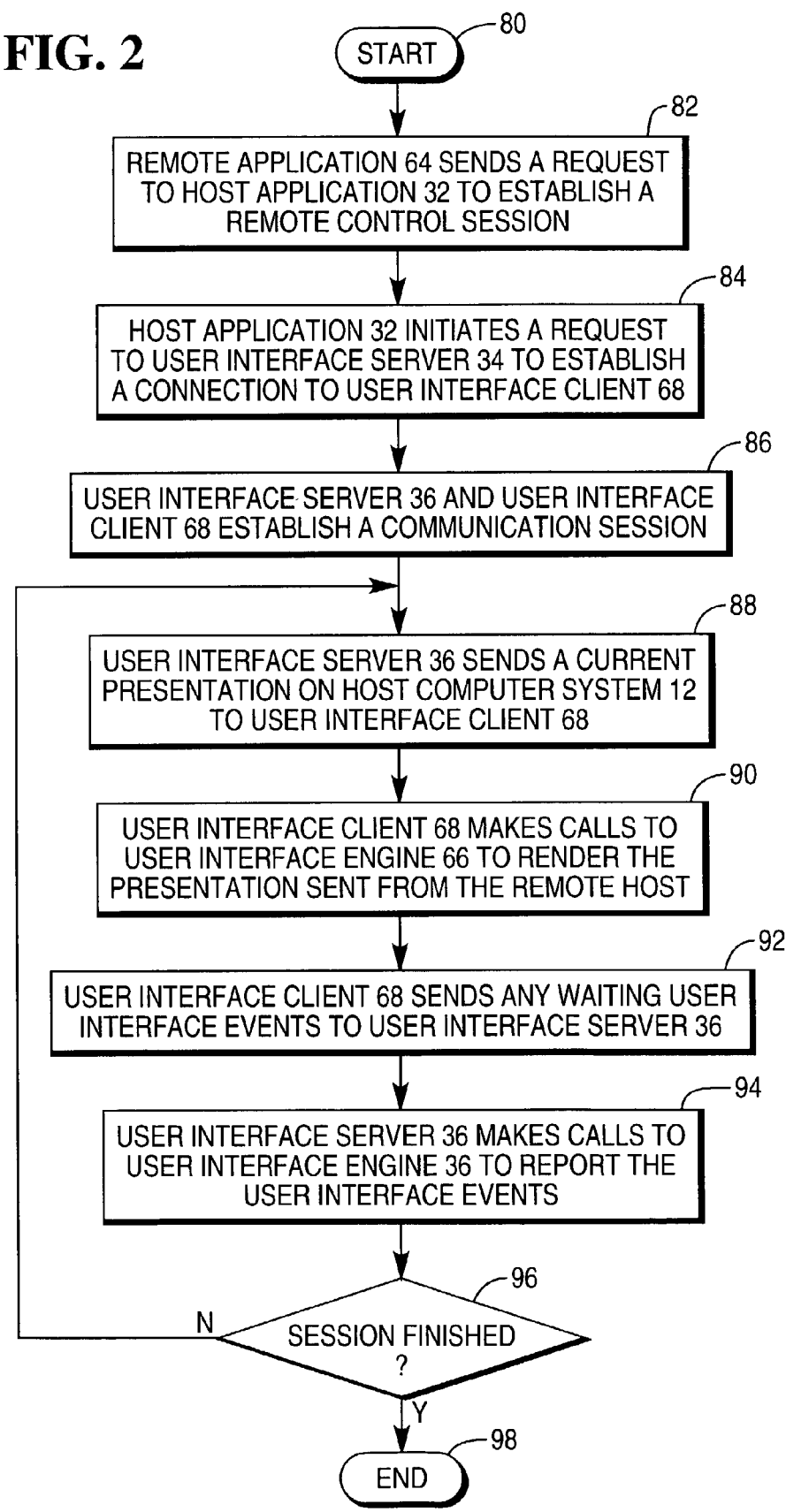

US 7,996,461 B1

METHOD OF REMOTELY CONTROLLING A USER INTERFACE

BACKGROUND OF THE INVENTION

The present invention relates to self-service kiosks and more specifically to a method of remotely controlling a user interface.

Self-service checkout operators need the ability to intervene with transactions at the self-service checkout lane from time to time. Such conditions include security alerts, customer help requests, and special transaction requirements, such as discounts or markdowns. The problem presented stems from the fact that the operator must either walk to the lane to assist the customer, or take an action at the remote attendant station.

Typical remote control software is directed to display and input information only. Such software relies on the operating system display services of a host computer and a remote computer. Also, display settings must typically be the same for the host and remote computers. Such software causes a pixel-by-pixel representation of the host computer's user interface to be displayed on the remote computer.

Therefore, it would be desirable to provide a method of remotely controlling a user interface of a computer without the limitations of known remote control software.

SUMMARY OF THE INVENTION

In accordance with the teachings of the present invention, a method of remotely controlling a user interface is provided.

The method includes the steps of sending a request to a host application of a first computer to establish a remote control session by the second computer over a network connection between the first and second computers, establishing a communication session between a user interface server of the first computer and a user interface client of the second computer, sending a current presentation of the host application rendered by a user interface engine of the first computer to the user interface client of the second computer by the user interface server of the first computer, wherein the presentation includes visual display information displayed on a display of the first computer, rendering the presentation of the host application by a user interface engine of the second computer, sending user interface events from the user interface client of the second computer to the user interface server of the first computer, and calling the user interface engine of the first computer by the user interface server to report the user interface events.

It is accordingly an object of the present invention to provide a method of remotely controlling a user interface.

It is another object of the present invention to provide a method of remotely controlling a user interface that allow a host application's user interface to be remotely presented and controlled by an application running on a remote computer via a network connection.

It is another object of the present invention to provide a method of remotely controlling a user interface that presents audio and other information besides the current state of display information and input information from the host computer.

It is another object of the present invention to provide a method of remotely controlling a user interface that do not rely on operating system display services of the host and the remote computer.

It is another object of the present invention to provide a method of remotely controlling a user interface that do not require like resolutions or a pixel-by-pixel representation of the host's user interface to be displayed on the remote user interface.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram illustrating a remote control method.

DETAILED DESCRIPTION OF THE PREFERRED EMBODIMENT

Figure 1:
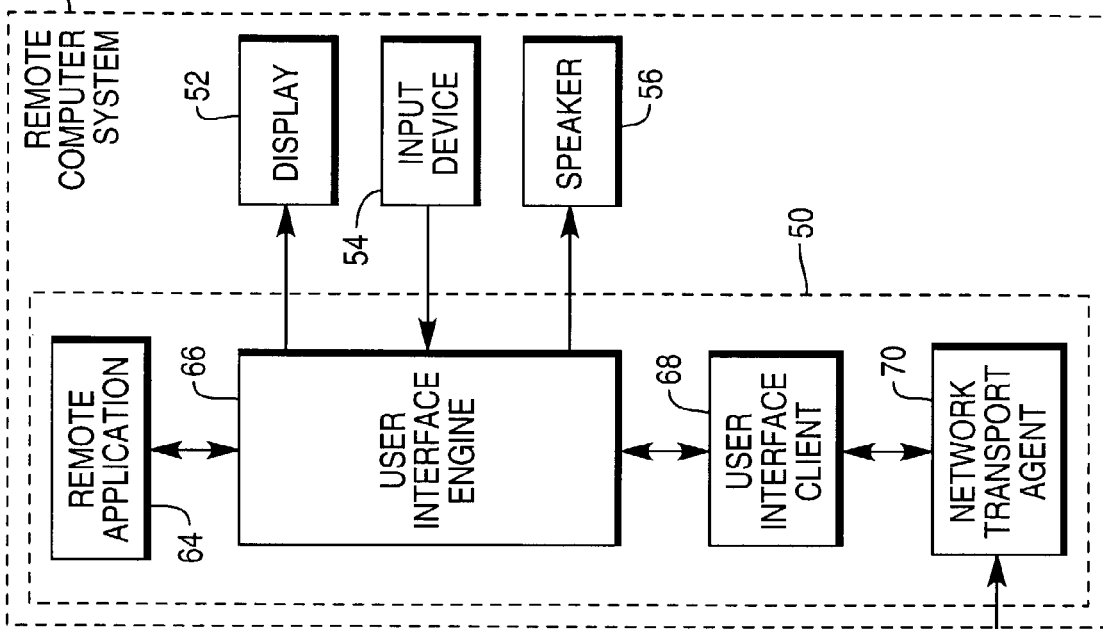
FIG. 1 is a block diagram of a system including a host computer and a remote computer.
Figure 1:
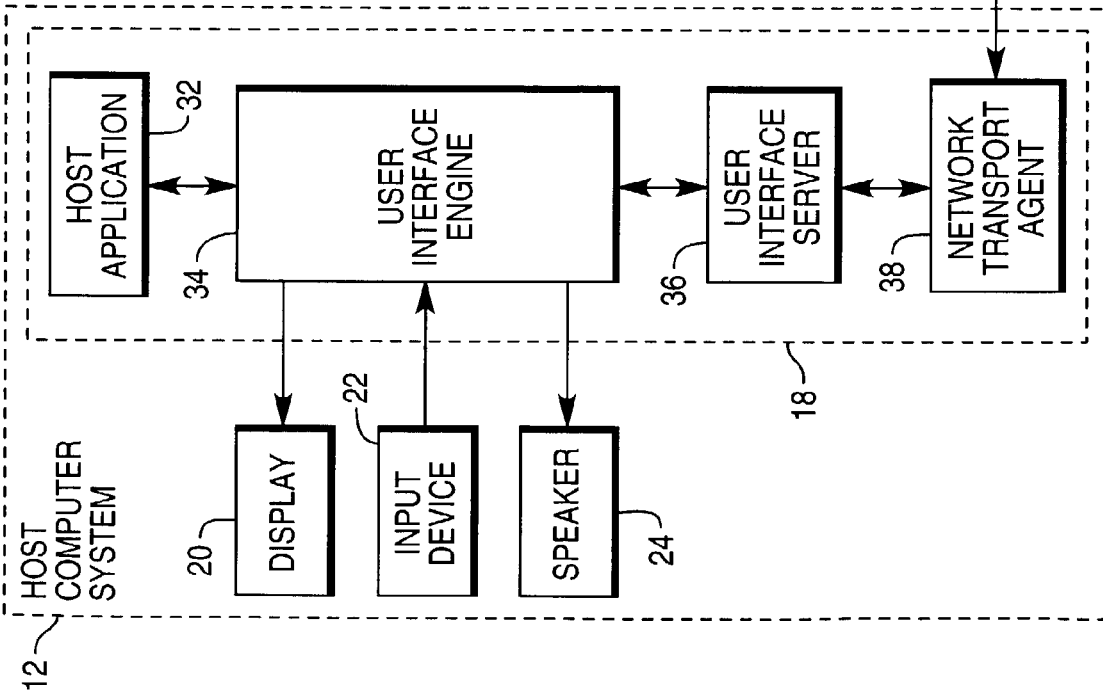

Turning now to FIG. 1, system 10 includes host computer system 12 and remote computer system 14. Host computer system 12 may include a self-service checkout terminal and remote computer system 14 may include an attendant terminal for monitoring self-service checkout terminals.

Host computer system 12 and remote computer system 14 are preferably connected via network 16.

Host computer system 12 includes processor 18, display 20, input device 22, and speaker 24.

Processor 18 executes host application 32, user interface engine 34, user interface server 36, and network transport agent 38.

Host application 32 is a primary checkout application, such as a self-service checkout application. Host application 32 facilitates scanning, bagging weighing, and purchasing of products by a customer. Host application 32 also performs remote control functions on host computer system 12.

User interface engine 34 is a software module that controls a presentation on host computer system 12 and sends the presentation to remote computer system 14 under control of host application 32. User interface engine 34 causes display information from host application 32 to be displayed by display 20 via operating system services. The display information is in terms of content and context rather than in terms of display attributes and rendering. User interface engine 34 is responsible for ensuring that the display information is rendered and displayed properly, in a format compatible with host computer system 12.

The concept of a "presentation" is important to the uniqueness of the invention since it represents an abstract view of user interface information at a specific point in time. The way the user interface information is displayed to the user of remote computer system 14 is important to remote computer system 14, not host computer system 12. Remote computer system 14 may display user interface information differently than host computer system 12, i.e., different fonts, colors, size, position); however, remote computer system 14 displays the same text. Existing display subsystems support creation of a presentation.

In a first example implementation, presentation information is expressed in terms of "element" objects, each of which represents a user interface artifact.

A second implementation uses a more conventional "User Interface Control" implementation for presentation services. Besides the state of a visual display, the presentation may include as well the state of playback of audio, video, or other media, as appropriate to whatever user interface information is currently being provided to a user of remote computer system 14.

User interface server 36 is a software module capable of sending a current presentation from host computer system 12 to user interface client 68 in remote computer system 14 over network 16, and accepting user interface events from user interface client 68 over network 16 and providing them to user interface engine 34 in host computer system 12.

An example of the type of user interface event accepted by user interface server 36 from user interface client 68 includes input operations completed by an attendant using input device 54, which may include a keyboard, pointing device, or both.

From a client/server perspective, user interface server 32 and user interface client 68 are peers to each other, such that user interface client 68 acts as a consumer of presentations from user interface engine 34, and user interface server 36 acts as a consumer of user interface events from user interface engine 66.

As the corollary, user interface client 68 acts as a provider of user interface events from user interface engine 66, and user interface server 36 acts as a provider of presentations from user interface engine 34.

User interface server 36 implements each interface required to allow user interface engine 34 to send its abstract state to user interface engine 66. User interface client 68 implements each interface required to allow user interface client 68 to send user interface events to user interface engine 34. A typical implementation would involve an API (application programming interface) set that allows events to travel in both directions. User interface display data travels in one direction and user input data travels in the other. Any API implementation that allows user interface display data to be transmitted between user interface server 36 and network transport 38 may be used on the host side, and any implementation that allows user input data to be transmitted between user interface engine 66 and user interface client 68 on the client side.

Network transport agent 38 is a software module capable of sending and receiving user interface information, in the form of presentations and user interface events, between user interface server 36 and user interface client 68.

Remote computer system 14 includes processor 50, display 52, input device 54, and speaker 56.

Processor 18 executes remote application 64, user interface engine 66, user interface server 68, and network transport agent 70.

Remote application 64 performs remote control functions on host computer system 12. Specifically, remote application 64 renders a current presentation from host application 32 and remotely controls host computer 12 by sending user interface events (e.g., inputs made by an attendant) to host computer 12.

User interface engine 66 is a software module that presents user interface information to the user of remote computer system 14 at the request of remote application 64. The display portions of user interface engines 34 and 66 are the same or functionally compatible display.

For example, user interface engine 66 causes display information from remote application 64 to be displayed by display 52 via operating system services. User interface engine 66 also causes display information from host application 32 to be displayed. User interface engine 66 is responsible for ensuring that both types of display information are rendered and displayed properly, in a format compatible with remote computer system 14.

While user interface engines 34 and 66 are required in host computer system 12 and remote computer system 14 respectively, user interface engines 34 and 66 need not be the same. Each merely needs to implement adequately similar presentation capabilities such that user interface information (e.g., display information and sound information) expressed to a user by host computer system 12 may also be expressed to another user by remote computer system 14. For example, if the presentation requires the display of a sentence of text, then user interface client 68 must be able to display the sentence of text in its entirety. If the presentation requires the rendering of a sound, user interface client 68 must have audio capabilities that allow the sound (or a functionally equivalent sound) to be rendered.

User interface engines 34 and 66 share enough of the same presentation concepts such that the data important to the user can be transmitted without regard to specific display position, resolution, size or other physical attributes. For example, if displays 20 and 52 are different in size or operate at different resolutions, user interface engine 66 is still able to display the same display information on display 52 as user interface engine 34 displays on display 20. In current implementations, this is accomplished by the understanding that there is a "frame". A frame is a user interface context within which the same presentation layout is used, regardless of content. User interface server 36 passes frame information to user interface client 68 which passes and possibly translates or adapts the frame information from user interface engine 34 into a format understood by user interface client 68.

As explained above in connection with the operation of user interface server 36, user interface client 68 is a software module capable of accepting user interface information from user interface engine 34 of host computer system 12, and sending user interface information from user interface engine 66 of remote computer system 14. User interface client 68 is responsible for providing the user interface information from user interface server 36 to user interface engine 66 in such a way that user interface engine 66 will present the user interface data correctly to the remote user.

Similar to network transport agent 38, network transport agent 70 is a software module capable of sending and receiving user interface information between user interface server 36 and user interface client 68.

Turning now to FIG. 2, the method of the present invention is illustrated beginning with START 80.

In step 82, remote application 64 sends a request to host application 32 to establish a remote control session.

In step 84, host application 32 initiates a request to user interface server 36 to establish a connection to user interface client 68.

In step 86, user interface server 36 and user interface client 68 establish a communication session.

In step 88, user interface server 36 sends a current presentation on host computer system 12 to user interface client 68.

In step 90, user interface client 68 makes calls to user interface engine 66 to render the presentation sent from the remote host.

In step 92, user interface client 68 sends any waiting user interface events to user interface server 36.

In step 94, user interface server 36 makes calls to user interface engine 36 to report the user interface events.

In step 96, the method continues with steps 88-94 repeating until the session is closed.

In step 98, operation ends.

The addition of a software layer including user interface server 36 and user interface client 68 provides advantages not found in other systems. This software layer provides remote control over a user interface with minimal impact on network bandwidth. It eliminates dependence upon a particular display scheme. New features of host application 32 can be presented to a remote user without changes to remote application 64.

The invention differs from standard remote control software in that it does not rely on operating system display services of both host computer system 12 and remote computer system 14.

The invention further differs in that it allows the actual display presentation of remote computer system 14 to differ significantly from the presentation of host computer system 12, as in the case where the display resolution is higher or lower at one side or the other. It does not require a pixel-by-pixel representation of the user interface of host computer system 12 to be displayed by remote computer system 14.

Although the present invention has been described with particular reference to certain preferred embodiments thereof, variations and modifications of the present invention can be effected within the spirit and scope of the following claims.

What is claimed is:

1. A method of remotely controlling a user interface of a first computer by a second computer comprising the steps of:
   sending a request to a host application of the first computer to establish a remote control session by the second computer over a network connection between the first and second computers;
   establishing a communication session between a user interface server of the first computer and a user interface client of the second computer;
   sending a current presentation of the host application rendered by a user interface engine of the first computer to the user interface client of the second computer by the user interface server of the first computer, wherein the presentation includes visual display information displayed on a display of the first computer, the visual display information being in terms of content and context rather than in terms of display attributes and rendering, and wherein the presentation further includes frame information reflecting a presentation layout used by the first computer independently of the content of the visual display information;
   rendering the presentation of the host application by a user interface engine of the second computer, the user interface engine using the visual display information and the frame information received from the first computer and constructing a display of the information based on preferences and attributes of the second computer, the preferences and attributes influencing the appearance of the visual display and frame information, such that the second computer displays the same visual display information as that displayed on the first computer, but presents the visual display information using visual characteristics differing from those of the display of the first computer and interprets and adapts frame information reflected in the frame information to layout preferences and capabilities of the second computer, the use of differing visual characteristics and adaptation of frame information causing a different appearance of the visual display information between the first and second computer;
   sending user interface events from the user interface client of the second computer to the user interface server of the first computer; and
   calling the user interface engine of the first computer by the user interface server to report the user interface events.

2. The method as recited in claim 1, wherein the presentation further comprises audio information to be played by a speaker.

3. The method as recited in claim 1, wherein the presentation further comprises video information displayed on a display of the first computer.

4. A method of remotely controlling a user interface of a self-service checkout computer by an attendant computer, the method comprising the steps of:
   sending a request to a transaction application of the self-service checkout computer, the transaction application supporting scanning, weighing and product purchase by a self-service checkout customer, to establish a remote control session by the attendant computer over a network connection between the self-service checkout and attendant computers;
   establishing a communication session between a user interface server of the self-service checkout computer and a user interface client of the attendant computer;
   sending a current presentation of the transaction application rendered by a user interface engine of the self-service checkout computer to the user interface client of the attendant computer by the user interface server of the self-service checkout computer, wherein the presentation includes visual display information displayed on a display of the self-service checkout computer, the visual display information being in terms of content and context rather than display attributes and rendering, and wherein the presentation further includes frame information reflecting a presentation layout used by the self-service checkout computer independently of the content of the visual display information, the visual display information relating to security alerts, customer help requests and special transaction requirements; rendering the presentation of the transaction application by a user interface engine of the attendant computer, such that the attendant computer displays the same information as that displayed on the self-service checkout computer, but presents the visual display information using visual characteristics differing from those of the display of the self-service checkout computer and interprets and adapts frame information reflected in the frame information to layout preferences and capabilities of the attendant computer, the use of differing visual characteristics and adaptation of frame information causing a different appearance of the visual display information between the self-service checkout computer and the attendant computer;
   sending user interface events from the user interface client of the attendant computer to the user interface server of the self-service checkout computer; and
   calling the user interface engine of the self-service checkout computer by the user interface server to report the user interface events.

5. The method of claim 1 further comprising the step of:
   storing application programming interface sets in the user interface clients of the first and second computers.

6. The method of claim 4 further comprising the step of:
   storing application programming interface sets in the user interface clients of the self-checkout computer and the attendant computer.

* * * * *